United States Patent
Bao et al.

(10) Patent No.: US 8,977,751 B2
(45) Date of Patent: *Mar. 10, 2015

(54) NETWORK USAGE THROTTLING SYSTEMS AND METHODS

(71) Applicant: Verizon Patent and Licensing Inc., Arlington, VA (US)

(72) Inventors: Derek Bao, Concord, CA (US); Patricia R. Chang, San Ramon, CA (US); Paula Scharlach, Basking Ridge, NJ (US); Luis Chan-Lizardo, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,306

(22) Filed: Nov. 26, 2012

(65) Prior Publication Data

US 2013/0086265 A1    Apr. 4, 2013

Related U.S. Application Data

(63) Continuation of application No. 12/610,696, filed on Nov. 2, 2009, now Pat. No. 8,321,565.

(51) Int. Cl.
*G06F 15/173* (2006.01)
*H04L 29/06* (2006.01)
*H04L 29/08* (2006.01)

(52) U.S. Cl.
CPC ............... *H04L 65/40* (2013.01); *H04L 67/22* (2013.01)
USPC ........................................................ 709/225

(58) Field of Classification Search
USPC .................................. 709/225, 224, 226, 206
See application file for complete search history.

(56) References Cited

U.S. PATENT DOCUMENTS

| | | | |
|---|---|---|---|
| 6,198,722 | B1 | 3/2001 | Bunch |
| 7,584,275 | B2 | 9/2009 | Shirota |
| 2004/0006638 | A1 | 1/2004 | Oberlander et al. |
| 2006/0098572 | A1 | 5/2006 | Zhang et al. |
| 2006/0218302 | A1 | 9/2006 | Chia et al. |
| 2011/0087776 | A1 | 4/2011 | Tabone et al. |

*Primary Examiner* — Lan-Dai T Truong

(57) ABSTRACT

Systems and methods for throttling network usage are disclosed. An exemplary method includes an access device maintaining throttling command interpretation data, receiving a throttling command broadcast over a wide area network, interpreting the throttling command based on the throttling command interpretation data, and conforming at least one operation of the access device to a network usage throttling level in accordance with the interpretation of the throttling command. Corresponding systems and methods are also disclosed.

22 Claims, 9 Drawing Sheets

| TCD bits | QoS Class 0 | QoS Class 1 | QoS Class 2 | QoS Class 3 | QoS Class 4 |
|---|---|---|---|---|---|
| 0000 | Allow | Allow | Allow | Allow | Allow |
| 0001 | Allow | Allow | Allow | Allow | Try Once |
| 0010 | Allow | Allow | Allow | Try Once | 2$^{nd}$ Net Only |
| 0011 | Allow | Allow | Try Once | 2$^{nd}$ Net only | Deny |
| 0100 | Allow | Allow | | 2$^{nd}$ Net only | Deny |
| ... | | | | | |
| 1111 | Allow | Deny | Deny | Deny | Deny |

Fig. 7

NETWORK USAGE THROTTLING SYSTEMS AND METHODS

RELATED APPLICATIONS

This application is a continuation application of U.S. patent application Ser. No. 12/610,696, filed on Nov. 2, 2009, and entitled NETWORK USAGE THROTTLING SYSTEMS AND METHODS, which is hereby incorporated by reference in its entirety.

BACKGROUND INFORMATION

Wide area networks provide people and organizations with access to a variety of applications and services. For example, with the proliferation of wireless communication networks, such as mobile telephone networks, access to mobile communication applications and services has become widely available.

As mobile telephone networks have advanced, more applications and services have been made available over the mobile telephone networks, including applications and services that are increasingly bandwidth intensive. This has led to increased concern over the constrained bandwidth resources of mobile telephone networks. Of particular concern are "usage spikes"—periods of time during which there are significant increases in network traffic. Usage spikes, which may be localized or network-wide, may have a variety of causes, including, for example, a large event (e.g., a sporting event) or a nationwide television broadcast that leads to a spike in network traffic. Usage spikes can be debilitating to a mobile telephone network or other wide area network. In some situations, for example, a usage spike may unintentionally block or otherwise impede or delay communications over the network. Unfortunately, a conventional end-user device (e.g., a mobile phone) used to access a wide area network typically reacts autonomously to blocked, impeded, or delayed network communications with trial and error based network usage requests that increase the demand for network bandwidth and exacerbate the problems caused by a usage spike.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 illustrates an exemplary data table containing throttling command interpretation data.

DETAILED DESCRIPTION OF PREFERRED EMBODIMENTS

Exemplary network usage throttling systems and methods are described herein. In certain embodiments described in more detail further below, for example, at least one network device may monitor usage of a wide area network, select a throttling command based on the monitored usage of the wide area network, and broadcast the throttling command to a plurality of access devices connected to the wide area network. The throttling command may be configured for interpretation and use by each access device within the plurality of the access devices to conform at least one operation to a network usage throttling level in accordance with the interpretation of the throttling command. For example, an access device may maintain throttling command interpretation data, receive the throttling command broadcast over the wide area network, interpret the throttling command based on the throttling command interpretation data, and conform at least one operation of the access device to the network usage throttling level in accordance with the interpretation of the throttling command. In this or similar manner, at least one network device may dynamically control throttling of network usage by one or more access devices based on monitored network usage. By throttling network usage as described herein, particular quality of service ("QoS") levels may be achieved and available network resources (e.g., network capacity such as network bandwidth, throughput, processing capacity, transmission media, etc.) may be prescriptively allocated to network users (e.g., subscribers) and/or access devices in a controlled and prioritized manner.

Exemplary network usage throttling systems and methods will now be described with reference to the accompanying drawings.

Figure 1:
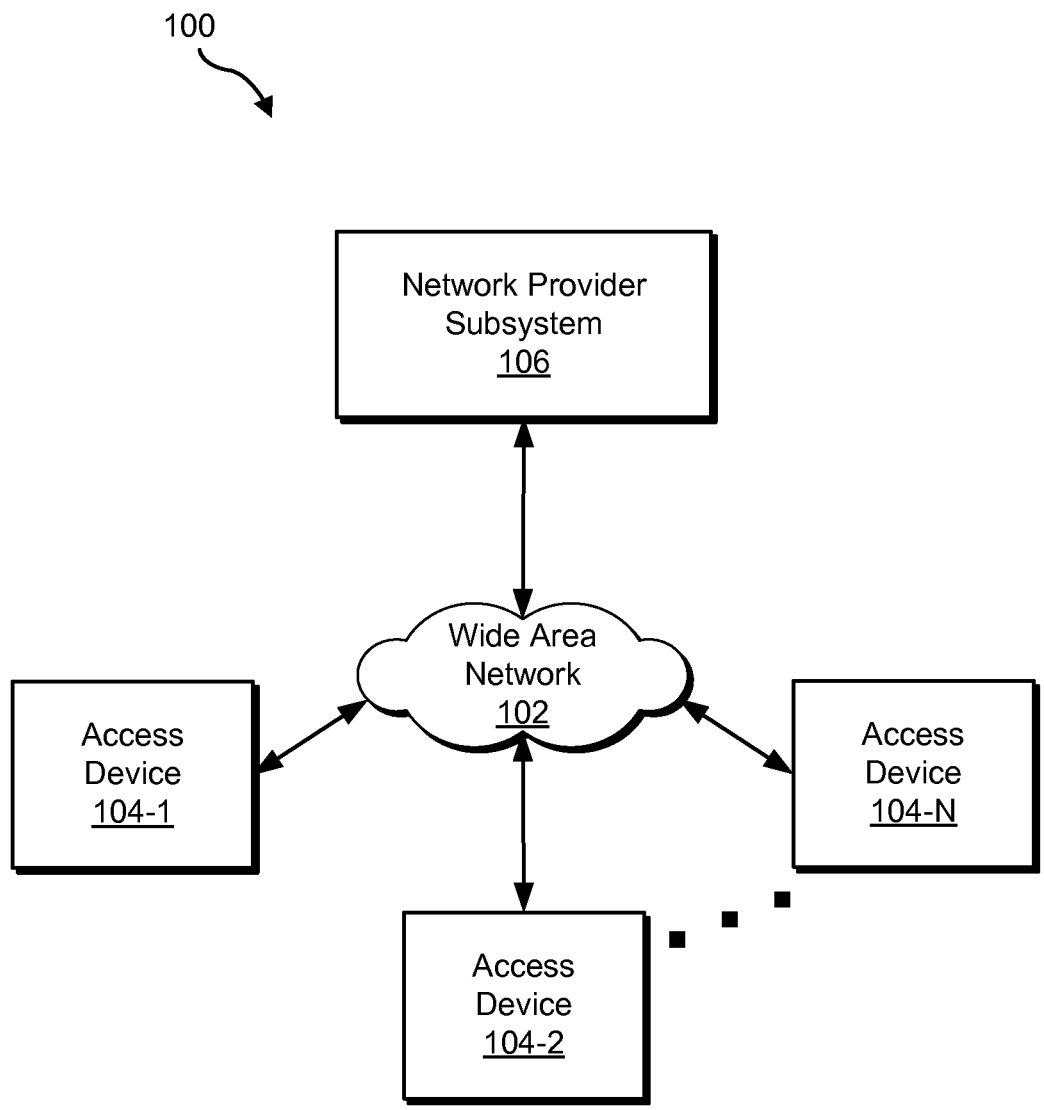
FIG. 1 illustrates an exemplary network usage throttling system.

FIG. 1 illustrates an exemplary network usage throttling system 100 (or simply "system") for throttling usage of a wide area network 102. System 100 may include one or more access devices 104 (e.g., access devices 104-1 through 104-N) and a network provider subsystem 106 connected to wide area network 102 and configured to communicate with one another via wide area network 102.

In certain embodiments, system 100 or one or more components of system 100 may include any computer hardware and/or computer-implemented instructions (e.g., software), or combinations of computer-implemented instructions and hardware, configured to perform one or more of the processes described herein. In particular, it should be understood that components of system 100 may be implemented on one physical computing device or may be implemented on more than one physical computing device. Accordingly, components of system 100 may include any one of a number of computing devices, and may employ any of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Network provider subsystem 106 and access devices 104 may communicate over wide area network 102 using any suitable communication technologies, devices, media, and protocols supportive of wide area communications. For example, network provider subsystem 106 and access devices 104 may communicate over wide area network 102 using any communication platforms and technologies suitable for transporting data and/or communication signals, including known communication technologies, devices, transmission media, and protocols supportive of remote data communications, examples of which include, but are not limited to, data transmission media, communications devices, Global System for Mobile Communications ("GSM") technologies, Long Term Evolution ("LTE") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO") (e.g., "1×EVDO"), radio frequency ("RF") signaling technologies, radio transmission technologies (e.g., One Times Radio Transmission Technology ("1×RTT")), Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), in-band and out-of-band signaling technologies, and other suitable communications technologies.

Wide area network 102 may include one or more wide area networks or types of wide area networks (and communication links thereto) capable of carrying data and/or communications signals between network provider subsystem 106 and access devices 104. For example, wide area network 102 may include, but is not limited to, one or more mobile telephone networks (e.g., cellular telephone networks), wide area wireless networks (e.g., satellite media broadcasting networks or terrestrial media broadcasting networks), subscriber television networks (e.g., broadcast, multicast, and/or narrowcast television networks), subscriber communications networks (e.g., VoIP networks), satellite networks, cable networks, hybrid fiber coax networks, optical fiber networks, broadband networks, narrowband networks, and any other wide area networks capable of carrying data and/or communications signals between network provider subsystem 106 and access devices 104. Communications between network provider subsystem 106 and access devices 104 may be transported using any one of the above-listed networks, or any combination or sub-combination of the above-listed networks.

Access devices 104 may include or be implemented by any computing devices configured to access wide area network 102 and/or one or more services or applications provided over wide area network 102. Examples of access devices 104 may include, but are not limited to, wireless communication devices, mobile communication devices (e.g., mobile phones such as cellular telephones), personal digital assistants, computers (e.g., laptop computers), and vehicular communication devices. In certain embodiments, for example, one or more access devices 104 may include mobile phone devices (e.g., smart-phone devices, cellular phone devices, etc.) configured to access one or more services (e.g., voice, text messaging, e-mail messaging, data, and video communications services) via wide area network 102. Access devices 104 may include end-user access devices associated with end users such as subscribers to one or more services or applications provided over wide area network 102.

In some examples, access devices 104 may register with network provider subsystem 106 in order to access services provided over wide area network 102. Accordingly, network provider subsystem 106 may authenticate and recognize access devices 104 registered to access services via wide area network 102. Consequently, network provider subsystem 106 may be aware of one or more attributes of access devices 104 and/or users associated with access devices 104, including, without limitation, access device types (e.g., make and/or model), service subscription information associated with access devices 104 and/or users (e.g., information indicating services that are available to an access device and/or subscriber), and subscription and/or service prioritization level information associated with access devices 104 and/or users of access devices 104. As described further below, such information may be used by network provider subsystem 106 to control throttling of usage of wide area network 102, including prioritizing allocation of network bandwidth based on specific services, types of services, subscription levels, QoS classifications, and/or attributes of access devices 104 and/or users of access devices 104.

Network provider subsystem 106 may include or be implemented by one or more network devices configured to communicate with access devices 104 via wide area network 102. In certain embodiments, network devices within network provider subsystem 106 may be controlled and/or operated by a provider and/or an operator of wide area network 102. Examples of network devices may include, but are not limited to, routers, switches, gateways, base station equipment, servers, and other network node devices. An exemplary configuration of network devices configured to control throttling of network usage is described in detail further below.

Figure 2:
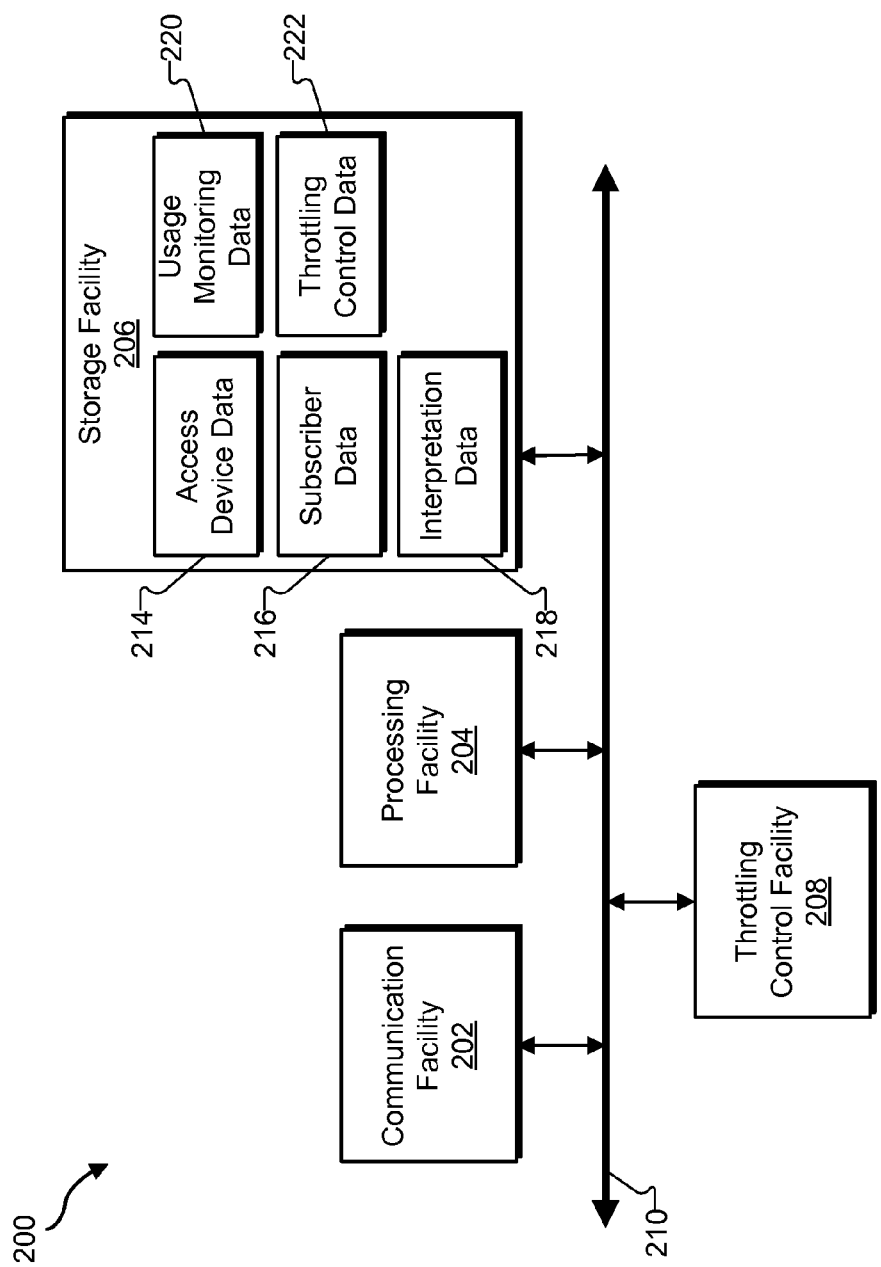
FIG. 2 illustrates an exemplary network device.

FIG. 2 illustrates an exemplary network device 200 that may implement or be included in network provider subsystem 106 and may be configured to control throttling of usage of wide area network 102. As shown in FIG. 2, device 200 may include a communication facility 202, a processing facility 204, a storage facility 206, and a throttling control facility 208 communicatively coupled one to another via a communication infrastructure 210. The components of device 200 may communicate with one another, including sending data to and receiving data from one another, using any suitable communication technologies. Moreover, the components of device 200 may be implemented on any network computing device or combination of network computing devices configured to perform one or more of the network bandwidth usage throttling processes described herein.

While an exemplary network device 200 is shown in FIG. 2, the components illustrated in FIG. 2 are not intended to be limiting. Additional or alternative components may be used in other embodiments. Moreover, while FIG. 2 illustrates components implemented by one network device 200, this is illustrative only. In certain embodiments, one or more components shown in FIG. 2 may be distributed across multiple network devices connected to wide area network 102. An example of such a distributed implementation is described further below. Components of the device 200 shown in FIG. 2 will now be described in additional detail.

Communication facility 202 may be configured to communicate with one or more computing devices. In particular, communication facility 202 may be configured to transmit and/or receive data and/or communication signals to/from access devices 104 via wide area network 102. For example, communication facility 202 may be configured to transmit throttling command interpretation data and throttling commands to one or more access devices 104 via wide area network 102. Examples of communication facility 202 may include, without limitation, a wired network interface (such as a network interface card), a wireless network interface (such as a wireless network interface card), a modem, a radio frequency transceiver, and any other suitable interface.

Processing facility 204 generally represents any type or form of processing unit (e.g., a processor) capable of processing data or interpreting, executing, and/or directing execution of one or more of the instructions, processes, and/or operations described herein. Processing facility 204 may direct execution of operations in accordance with one or more applications or other computer-executable instructions such as may be stored in storage facility 206 or another computer-readable medium.

Storage facility 206 may include one or more data storage media, devices, or configurations and may employ any type, form, and combination of data storage media and/or device. For example, storage facility 206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage facility 206. For example, data representative of one or more executable applications configured to direct processing facility 204 to perform one or more of the network-level operations described herein may be stored within storage facility 206. In some examples, data may be arranged in one or more databases residing within storage facility 206.

FIG. 2 illustrates examples of data that may be maintained in storage facility 206. As shown, access device data 214, subscriber data 216, interpretation data 218, usage monitoring data 220, and throttling control data 222 may be maintained in storage facility 206. Access device data 214 may include any data descriptive of or otherwise associated with access devices 104, including, for example, device identifiers, device type identifiers (e.g., make, model, etc.), device capabilities data (e.g., information indicating communication protocol and/or platform capabilities), device registration data, device authentication data, and any other data related to access devices 104. Subscriber data 216 may include any data descriptive of or otherwise associated with users of access devices 104, including, for example, user identifiers, user authentication data, user permissions data, data indicating one or more services to which users subscribe or are otherwise granted access, service level agreement data associated with users, and/or any other data related to users of access devices 104.

Interpretation data 218 may include data configured for use by access devices 104 to interpret throttling commands broadcast by network provider subsystem 106 to access devices 104 via wide area network 102. Interpretation data 218 may include one or more instances of interpretation data configured to be selected and transmitted to one or more access devices 104 via wide area network 102. Hence, device 200 may select an instance of interpretation data from interpretation data 218 stored in storage facility 206 and transmit the selected interpretation data instance to an access device 104 for use by the access device 104 to interpret throttling commands broadcast by network provider subsystem 106 to access devices 104 via wide area network 102. Examples of interpretation data are described in more detail further below.

Usage monitoring data 220 may include data related to monitoring of usage of wide area network 102. For example, usage monitoring data 220 may include recorded network usage data (e.g., monitored network usage parameter data such as monitored bandwidth usage parameter data), predefined network usage thresholds (e.g., network usage parameter thresholds), and/or any other data that may be useful for and/or related to monitoring of network usage.

Throttling control data 222 may include data related to controlling throttling of usage of wide area network 102. For example, throttling control data 222 may include data representative of one or more throttling commands that may be broadcast to one or more access devices 104, heuristics configured to be used to select, initiate, and/or direct throttling control operations based on monitored network usage, and/or any other data that may be useful for and/or related to controlling throttling of network usage.

Throttling control facility 208 may be configured to control throttling of usage of wide area network 102. For example, throttling control facility 208 may be configured to perform and/or direct one or more network devices such as network device 200 to perform one or more of the network usage throttling operations described herein. In particular, throttling control facility 208 may direct network device 200 to instruct one or more access devices 104 to conform one or more operations to certain network usage throttling levels.

Figure 3:
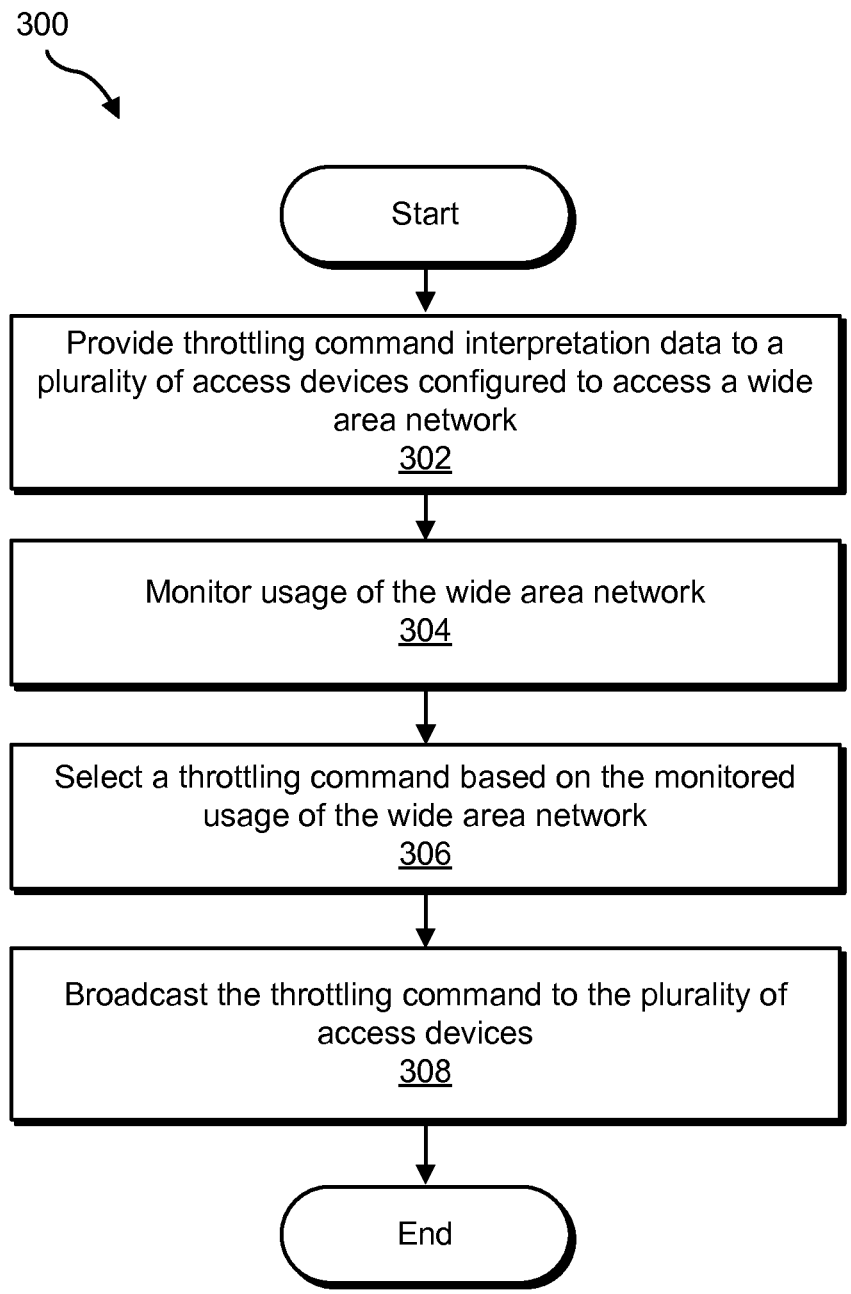
FIG. 3 illustrates an exemplary network usage throttling method.

To illustrate, FIG. 3 shows an exemplary network usage throttling method 300. While FIG. 3 illustrates exemplary steps according to one embodiment, other embodiments may omit, add to, reorder, and/or modify any of the steps shown in FIG. 3. In certain embodiments, one or more of the steps shown in FIG. 3 may be performed by network provider subsystem 106 and/or one or more network devices such as network device 200.

In step 302, throttling command interpretation data (or simply "interpretation data") is provided to a plurality of access devices configured to access a wide area network. Interpretation data may be provided to one or more access devices 104 in any suitable way. In certain embodiments, for example, interpretation data may be transmitted by network provider subsystem 106 to an access device 104 in response to an activation, setup, or registration of the access device 104 (e.g., registration of the access device 104 with network provider subsystem 106). Additionally or alternatively, interpretation data may be provided to one or more access devices 104 periodically and/or in response to other predefined events, including requests for interpretation data received from the access devices. For instance, interpretation data may be periodically provided to one or more access devices 104 during times of off-peak network usage. This may allow interpretation data to be periodically updated as may suit a particular implementation. As described further below, each of the access devices 104 may be configured to maintain and use interpretation data to interpret throttling commands received from network provider subsystem 106.

In certain embodiments, network provider subsystem 106 may provide different instances of interpretation data to different access devices 104. The instances of interpretation data may be specific to an access device, a type of access device, a capability of an access device, a user of access device, a service subscription, a subscriber or subscription service level, a QoS class, a service, a service type, etc. As an example, a first instance of interpretation data may be provided to a first subset of access devices 104, and a second instance of interpretation data different from the first instance may be provided to a second subset of access devices 104. The first subset of access devices 104 may include access devices that share one or more attributes such as a device type (e.g., same make and/or model), device capability, service level, and/or service subscription. The second subset of access devices 104 may include access devices that share one or more different attributes such as a different device type, device capability, service level, and/or service subscription. As described further below, different instances of interpretation data may be used to prescriptively control allocation of network resources in a prioritized manner.

In alternative embodiments, a uniform instance of interpretation data may be provided to access devices 104, which may be configured to interpret the uniform instance of interpretation data differently based on access device, access device type, access device capability, a user of access device, a service subscription, a subscriber or subscription service level, a QoS class, a service, a service type, etc.

In step 304, usage of the wide area network is monitored. For example, network provider subsystem 106 may monitor usage of wide area network 102. The monitoring may be performed in any suitable way and may include one or more network devices monitoring one or more parameters descriptive of usage of wide area network 102. The monitoring may be performed using active monitoring technologies, passive monitoring technologies, or a combination of active and passive monitoring technologies. In certain embodiments, the monitoring may include determining one or more network usage parameters descriptive of network capacity utilization and/or availability (e.g., bandwidth utilization and/or bandwidth availability) within one or more portions of wide area network 102.

Monitoring of network usage in step 304 may include detecting one or more network usage conditions (e.g., network capacity utilization conditions). Such conditions may include, without limitation, various levels of underutilization, normal utilization, and overutilization of network resources (e.g., bandwidth). These conditions may be detected using one or more predefined network usage thresholds.

Accordingly, the monitoring in step 304 may include comparing monitored network usage parameters to predefined network usage thresholds, including predefined network usage thresholds (e.g., network capacity utilization thresholds) specified in usage monitoring data 220. A comparison of monitored network usage parameters to predefined network usage thresholds may be used by throttling control facility 208 as a basis for selecting and applying one or more network usage throttling levels. For example, when a determination is made that a monitored network usage parameter satisfies a predefined network usage parameter threshold, throttling control facility 208 may automatically select and apply an appropriate network usage throttling level as described herein, such as by performing and/or initiating performance of steps 306 and 308 of method 300.

In step 306, a throttling command is selected based on the monitored usage of the wide area network. For example, monitored network usage data may be compared with one or more predefined thresholds as described above and a particular throttling command may be selected based on a result of the comparison. The throttling command may be selected from a plurality of throttling commands. Each of the throttling commands may be mapped to one or more network usage parameters and/or thresholds such that when a particular network usage parameter value is detected, an appropriate throttling command for the network usage parameter value may be selected.

In certain embodiments, each of the throttling commands may be associated with a particular network usage throttling level such that the throttling command may be configured to direct conformance to the corresponding network usage throttling level. To illustrate, when network bandwidth usage is detected to be within thresholds defining normal levels of traffic in wide area network 102, a throttling command associated with a normal operational throttling level may be selected in step 306. If the network bandwidth usage increases and is detected to be within thresholds defining congested levels of traffic in wide area network 102 (e.g., a bandwidth overload condition), a throttling command associated with a congested operational throttling level may be selected in step 306. In order to help remediate congestion within wide area network 102, the congested operational throttling level may be more restrictive than the normal operational throttling level as to what types and/or levels of traffic are allowed to be transmitted over wide area network 102. Accordingly, operation at the congested operational throttling level may help remediate congestion within the wide area network 102. When the congestion is remediated, the throttling command associated with the normal operational throttling level may be selected in step 306 and applied to return operation to the less restrictive normal operational throttling level. These throttling commands and associated network usage throttling levels are illustrative only. Various throttling commands and associated network usage throttling levels may be defined as may suit a particular implementation.

By selecting a throttling command based on monitored network usage, operational network usage throttling levels may be dynamically adjusted. In certain embodiments, various graduated network usage throttling levels defining various levels of allowed network usages may be defined and used to automatically and/or dynamically control usage of wide area network 102. The graduated network usage throttling levels may range from a least restrictive level that may be applied when network usage is low to a most restrictive level that may be applied when network usage is extremely congested.

In step 308, the throttling command selected in step 306 is broadcast to the plurality of access devices. For example, network provider subsystem 106 may broadcast the throttling command to access devices 104 via wide area network 102. The broadcasting of the throttling command may be performed in any suitable way. In certain embodiments, the throttling command may be inserted within one or more control signals that are broadcast to access devices 104. The control signals may include signals that are broadcast to access devices 104 as part of normal control and/or general overhead signaling in wide area network 102. Accordingly, throttling commands may be broadcast to access devices 104 without using user bandwidth of wide area network 102. Moreover, throttling commands may be broadcast to access devices 104 without having to utilize resources to specially create and transmit dedicated and/or individualized throttling command messages to each of the access devices 104. Hence, throttling commands may be broadcast in a manner that avoids creating additional strain on resources of wide area network 102.

A broadcast of a throttling command in step 308 may be network wide or localized within wide area network 102. To illustrate, in some examples, access devices 104 shown in FIG. 1 may represent all end-user access devices connected to wide area network 102, and a throttling command may be broadcast network wide to all end-user access devices connected to wide area network 120. In other examples, access devices 104 shown in FIG. 1 may represent a localized subset of end-user access devices connected to wide area network 102, and a throttling command may be broadcast only to the localized subset of end-user access devices. For example, localized network congestion affecting only a portion of wide area network 102 may be detected in step 304. A throttling command may be selected in step 306 and broadcast in step 308 to only the end-user access devices within the affected locality. This may be accomplished in any suitable way, such as by instructing only a subset of network devices to broadcast the throttling command to access devices that are connected to (e.g., within range of) the network devices. For instance, within a cellular phone network, the throttling command may be broadcast by only one base station transmitter to end-user devices within a cell served by the base station transmitter. Such localized broadcasts of throttling commands may be useful for addressing localized usage spikes within wide area network 102.

While steps 306 and 308 may be performed automatically in response to monitored usage of the wide area network 102, such as in response to detected conditions within the wide area network 102, in certain embodiments, one or more manual override tools may be provided to an operator of the wide area network 102 having appropriate credentials such that the operator may manually override automatic throttling of network usage by manually selecting and initiating a broadcast of one or more throttling commands.

The throttling command broadcast in step 308 may be configured for interpretation and use by each of the access devices 104 to conform at least one operation of the access devices 104 to a network usage throttling level in accordance with the interpretation of the throttling command. To this end, each access device 104 may maintain and use interpretation data to interpret throttling commands and to conform operation of the access device 104 to network usage throttling levels associated with the throttling commands.

One or more of the steps of method 300 may be repeated. For example, step 302 may be repeated to update interpretation data maintained by access devices 104. As another example, step 304 may be repeated to continually monitor network usage. Steps 306 and 308 may be repeated each time a throttling command is to be selected and provided to access devices 104. Accordingly, various steps of method 300 may be repeated to dynamically apply various network usage throttling levels to which access devices 104 may conform their operations.

Figure 4:
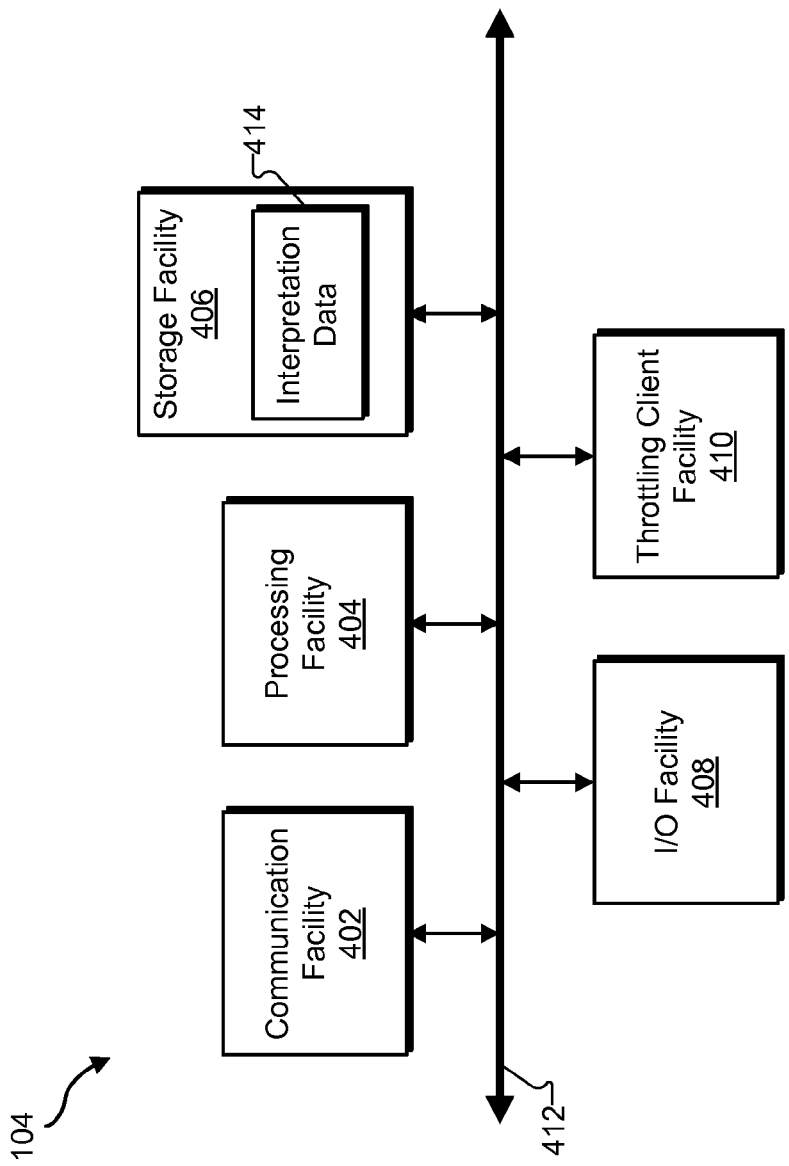
FIG. 4 illustrates an exemplary access device.

FIG. 4 illustrates an exemplary access device 104 that may be configured to interpret and use throttling commands to conform operation of the access device 104 to network usage throttling levels associated with the throttling commands. As shown in FIG. 4, access device 104 may include a communication facility 402, a processing facility 404, a storage facility 406, an input/output ("I/O") facility 408, and a throttling client facility 410 communicatively coupled one to another via a communication infrastructure 412. The components of access device 104 may communicate with one another, including sending data to and receiving data from one another, using any suitable communication technologies.

While an exemplary access device 104 is shown in FIG. 4, the components illustrated in FIG. 4 are not intended to be limiting. Additional or alternative components may be used in other embodiments. Components of the access device 104 shown in FIG. 4 will now be described in additional detail.

Communication facility 402 may be configured to communicate with one or more computing devices. In particular, communication facility 402 may be configured to transmit and/or receive data and/or communication signals to/from one or more network devices associated with network provider subsystem 106. For example, communication facility 402 may be configured to receive throttling command interpretation data and throttling commands from network provider subsystem 106 via wide area network 102. Examples of communication facility 402 may include, without limitation, a wired network interface (such as a network interface card), a wireless network interface (such as a wireless network interface card), a modem, a radio frequency transceiver, and any other suitable interface.

Processing facility 404 generally represents any type or form of processing unit (e.g., a processor) capable of processing data or interpreting, executing, and/or directing execution of one or more of the instructions, processes, and/or operations described herein. Processing facility 404 may direct execution of operations in accordance with one or more applications or other computer-executable instructions such as may be stored in storage facility 406 or another computer-readable medium.

Storage facility 406 may include one or more data storage media, devices, or configurations and may employ any type, form, and combination of data storage media and/or device. For example, storage facility 406 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage facility 406. For example, data representative of one or more executable applications configured to direct processing facility 404 to perform one or more of the operations described herein may be stored within storage facility 406. In some examples, data may be arranged in one or more databases residing within storage facility 406. As shown in FIG. 4, throttling command interpretation data 414 (or simply "interpretation data 414") may be maintained by access device 104 in storage facility 406. An example of interpretation data that may be maintained by access device 104 is described further below.

Throttling client facility 410 may be configured to perform and/or direct access device 104 to perform one or more of the client-side network usage throttling operations described herein. For example, throttling client facility 410 may maintain interpretation data 414 in storage facility 406, interpret throttling commands based on the interpretation data 414, and conform one or more operations of access device 104 to network usage throttling levels associated with the throttling commands.

Figure 5:
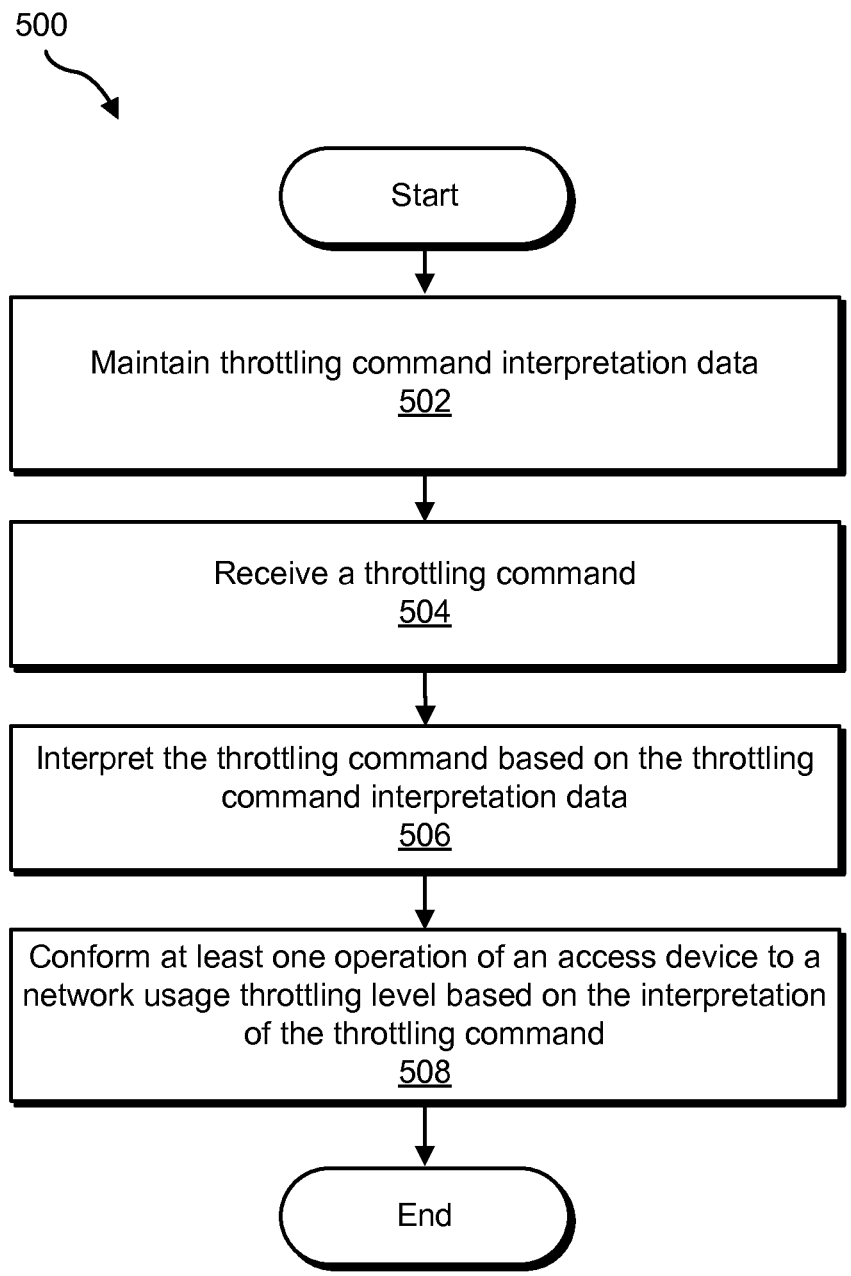
FIG. 5 illustrates an exemplary network usage throttling method.

To illustrate, FIG. 5 shows an exemplary network usage throttling method 500. While FIG. 5 illustrates exemplary steps according to one embodiment, other embodiments may omit, add to, reorder, and/or modify any of the steps shown in FIG. 5. In certain embodiments, one or more of the steps shown in FIG. 5 may be performed by access device 104.

In step 502, throttling command interpretation data is maintained. For example, access device 104 may maintain interpretation data 414 in storage facility 406. In certain examples, the maintaining of throttling command interpretation data in step 502 may include receiving interpretation data from network provider subsystem 106 and storing the interpretation data in storage facility 406. Network provider subsystem 104 may select an instance of interpretation data 218 maintained in storage facility 206 and provide the selected data instance to access device 104 in any of the ways described above.

In step 504, a throttling command is received. For example, access device 104 may receive a throttling command transmitted by network provider subsystem 106 via wide area network 102. The throttling command may be transmitted in any of the ways described above, including as data bits included in one or more control signals used during normal operations of wide area network 102, as described above.

In step 506, the throttling command is interpreted based on the throttling command interpretation data maintained in step 502. For example, access device 104 may interpret the throttling command received in step 504 based on interpretation data 414 maintained in storage facility 406 of access device 104. In certain embodiments, the interpretation of the throttling command may include identifying a network usage throttling level associated with the throttling command. As described in more detail further below, the network usage throttling level may define a set of one or more network usage conformance commands indicating how to conform operations of access device 104 to the network usage throttling level. In some examples, the network usage throttling level and/or the corresponding set of network usage conformance commands may be specified in interpretation data 414.

In step 508, at least one operation of an access device is conformed to a network usage throttling level based on the interpretation of the throttling command. For example, access device 104 may conform one or more operations of access device 104 to a network usage throttling level associated with the throttling command received in step 504. Conformance of one or more operations of access device 104 to the network usage throttling level may be accomplished in any suitable way, including using one or more network usage conformance commands associated with the network usage throttling level and specified in interpretation data 414 to determine how to conform operations of access device 104 to the network usage throttling level. Examples of conforming one or more operations of access device 104 to a network usage throttling level may include, but are not limited to, allowing certain network usage operations of access device 104, limiting certain network usage operations of access device 104 (e.g., limiting attempts to perform a network usage operation to a certain predefined number of attempts (e.g., "try once")), directing certain network usage operations normally performed using a particular network resource to use another network resource within wide area network 102, and denying performance of certain network usage operations.

As mentioned above, network usage throttling may be selectively applied based on specific network services, types of network services, applications, service subscriptions, service subscription levels, QoS classifications, and/or attributes of access devices 104 and/or users of access devices 104. For example, a particular network usage throttling level may be applied for a particular network service, network service type, application, service subscription, service subscription level, QoS class, access device attribute, and/or user attribute, and another particular network usage throttling level may be applied for another particular network service, network service type, application, service subscription, service subscription level, QoS class, access device attribute, and/or user attribute. This may allow system 100 to prioritize certain network usage operations by network services, types of network services, applications, service subscriptions, service subscription levels, QoS classifications, attributes of access devices 104, and/or attributes of users of access devices 104.

Figure 6:
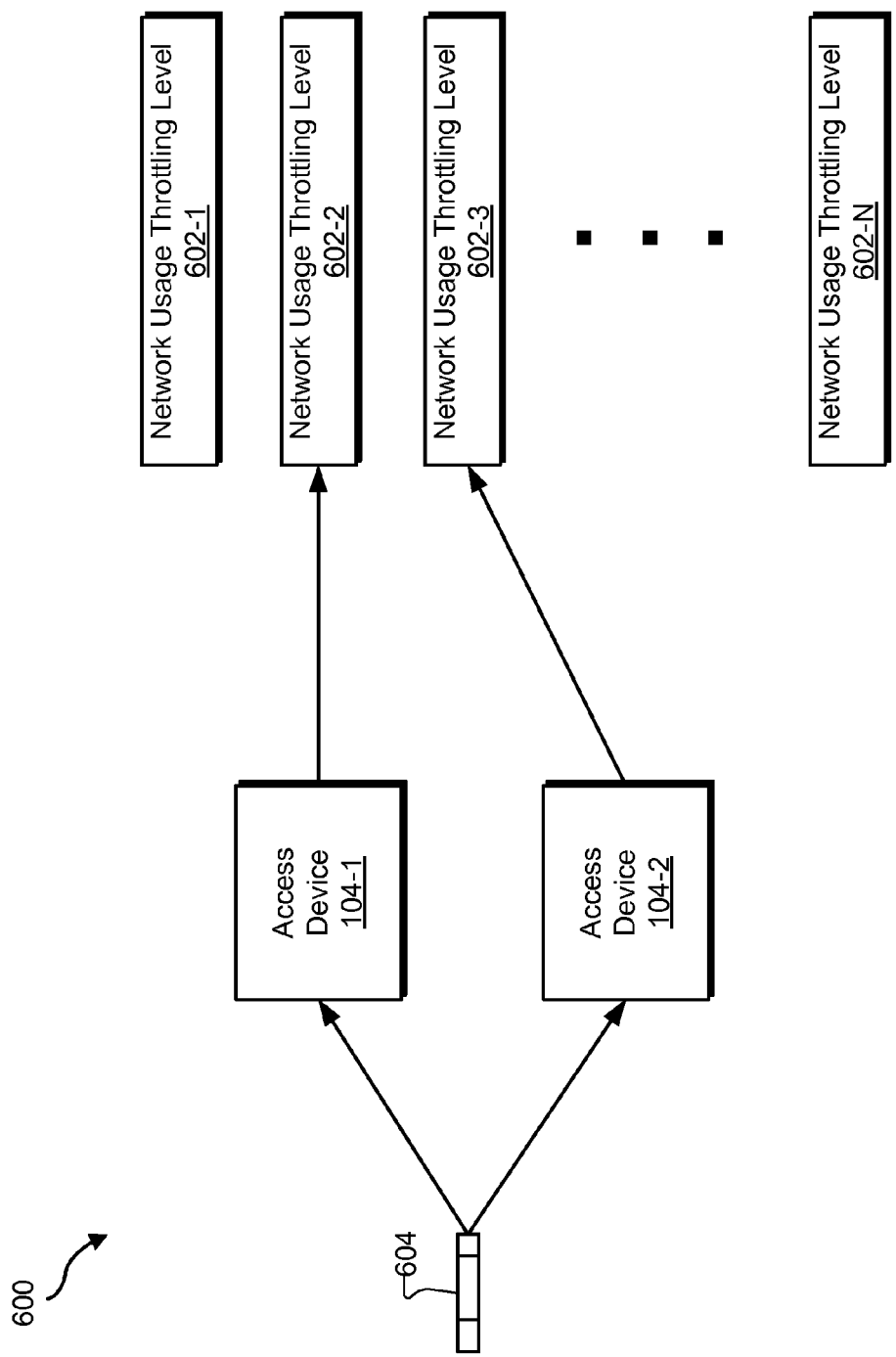
FIG. 6 illustrates an exemplary selection of different network usage throttling levels.

FIG. 6 illustrates an exemplary selection 600 of different network usage throttling levels. As shown, a plurality of graduated network usage throttling levels 602 (e.g., network usage throttling levels 602-1 through 602-N) may be defined for application within wide area network 102. Each of the network usage throttling levels 602 may specify a particular set of network usage conformance commands to be utilized by one or more access devices 104 to conform operations to the corresponding network usage throttling level, as mentioned above.

As illustrated in FIG. 6, access devices 104-1 and 104-2 may each receive a throttling command 604 from network provider subsystem 106. Access devices 104-1 and 104-2 may interpret the throttling command 604 based on interpretation data maintained by access devices 104-1 and 104-2. The interpretation of the throttling command 604 may include identifying one of the network usage throttling levels 602 to which each of the access devices 104-1 and 104-2 will conform its network usage operations. As shown in FIG. 6, each of the access devices 104-1 and 104-2 may identify and select a different one of the network usage throttling levels 602. In the illustrated example, access device 104-1 selects network usage throttling level 602-2 and access device 104-2 selects network usage throttling level 602-3. Accordingly, each of the access devices 104-1 and 104-2 may conform its network usage operations to a different network usage throttling level. For example, access device 104-1 may conform its network usage operations to network usage throttling level 602-2 and access device 104-2 may conform its network usage operations to network usage throttling level 602-3.

The capability to select and apply specific network usage throttling levels may be implemented in any suitable way. In certain embodiments, each access device 104 is configured to select a network usage throttling level associated with a throttling command based on interpretation data 414 maintained by the access device 104. The interpretation data 414 may be defined to account for specific network services, types of network services, applications, service subscriptions, service subscription levels, QoS classifications, attributes of access device 104, and/or attributes of users of access device 104 such that selection of a network usage throttling level is based at least in part on specific network services, types of network services, application service subscriptions, service subscription levels, QoS classifications, attributes of access device 104, and/or attributes of users of access device 104.

As an example, network usage throttling levels 602 may range from a least restrictive throttling level 602-1 to a most restrictive throttling level 602-N. Access device 104-1 may be associated with a higher priority subscription level than is access device 104-2. Accordingly, to prioritize the higher priority subscription level, access device 104-1 may be configured to select a relatively less restrictive throttling level 602-2 in response to receipt of throttling command 604, and access device 104-2 may be configured to select a relatively more restrictive throttling level 602-3 in response to receipt of the throttling command 604. Hence, in response to throttling command 604, network usage by access device 104-1 may be given priority over network usage by access device 104-2.

As another example, throttling of network usage may be selectively applied by service, service type, and/or QoS class. To this end, a network usage throttling level may specify different conformance commands for different services accessible by an access device 104. Accordingly, when the access device 104 operates in accordance with the network usage throttling level, certain network usage operations associated with a first service (e.g., a text messaging service) accessible by an access device 104 may be allowed while other operations associated with a second service (e.g., a video access service) accessible by the access device 104 may be denied.

The above-described examples of selective throttling for prioritized network usage are illustrative only. Other prioritizations may be applied in other examples.

To help facilitate an understanding of interpretation of throttling commands and conformance to network usage throttling levels associated with the throttling commands, FIG. 7 illustrates exemplary interpretation data in the form of a data table 700. Data representative of data table 700 may be maintained as interpretation data 414 by access device 104. Data table 700 may map throttling commands to corresponding network usage throttling levels and corresponding sets of conformance commands configured to indicate specific usages of wide area network 102 that are allowed, limited, moved, and/or denied when access device 104 operates within the network usage throttling levels. Accordingly, access device 104 may use data table 700 to interpret a throttling command to identify a network usage throttling level associated with the throttling command and to conform one or more operations of the access device 104 to the network usage throttling level by using a set of one or more network usage conformance commands included within the network usage throttling level.

As shown in FIG. 7, data table 700 may include a column 702 of throttling commands in the form of throttling command data ("TCD") bits. Each of the non-header rows 704 (e.g., rows 704-1 through 704-N) in data table 700 may be associated with a throttling command contained within column 702 and may represent a network usage throttling level associated with the throttling command. In particular, data values specifying network usage conformance commands may be included within each row 704 associated with a throttling command and may indicate network usage operations to be performed by access device 104 to conform to a network usage throttling level associated with the throttling command. Such data values may indicate whether certain network usage operations are allowed, denied, limited, and/or moved to another network resource when conforming to the network usage throttling level. In FIG. 7, a data value of "allow" may indicate that certain network usage operations are allowed when operating in accordance with a network usage throttling level, a data value of "try once" may indicate that certain network usage operations are limited to a particular number of attempts (e.g., one attempt) when operating in accordance with a network usage throttling level, a data value of "$2^{nd}$ net only" may indicate that certain network usage operations are moved from a network platform normally used for the network usage operations to another network platform within wide area network 102 when operating in accordance with a network usage throttling level, and a data value of "deny" may indicate that certain network usage operations are denied when operating in accordance with a network usage throttling level. These data values and corresponding conformance actions are illustrative only. Other data values and/or conformance actions may be used in other embodiments to conform one or more network usage operations to a network usage throttling level corresponding to a throttling command.

Conformance commands may be specific to a particular service, service type, application, subscription, etc. For example, data table 700 includes columns 706 (e.g., columns 706-1 through 706-5) representing various services accessible by access device 104. In the illustrated example, each service coincides with a QoS class with column 706-1 representing a first service ("QoS Class 0"), column 706-2 representing a second service ("QoS Class 1"), column 706-3 representing a third service ("QoS Class 2"), column 706-4 representing a fourth service ("QoS Class 3"), and column 706-5 representing a fifth service ("QoS Class 4"). As an example, the first service (column 706-1) may represent a text messaging service, the second service (column 706-2) may represent a voice service, the third service (column 706-3) may represent a best efforts data service, the fourth service (column 706-4) may represent a priority data service, and the fifth service (column 706-5) may represent a video service accessible by access device 104 via wide area network 102.

Accordingly, access device 104 may use data table 700 to identify network usage conformance commands to be used to conform service-specific operations to a network usage throttling level associated with a throttling command. To illustrate, when the throttling command most recently received by access device 104 is the throttling command labeled "0000" within row 704-1 of data table 700, access device 104 may search data table 700 to locate the throttling command and identify a network throttling level (row 704-1) associated with the throttling command. Access device 104 may identify a corresponding network usage conformance command within the same row 704-1 that indicates how operations specific to a particular service are to be conformed when operating in accordance with a network usage throttling level associated with the throttling command. In the illustrated example, operations associated with each of the services indicated in data table 700 are to be allowed as access device 104 conforms its operation to the network usage throttling level associated with the throttling command labeled "0000." As another example, when the throttling command most recently received by access device 104 is the throttling command labeled "0100" within row 704-5 of data table 700, access device 104 may search data table 700 to locate the throttling command and identify a network throttling level (row 704-5) associated with the throttling command. Access device 104 may identify a corresponding network usage conformance command within the same row 704-5 that indicates how operations specific to a service are to be conformed when operating in accordance with a network usage throttling level associated with the throttling command. In the illustrated example, operations associated with the first and second services ("QoS Class 0" and "QoS Class 1") indicated in data table 700 are to be allowed, operations associated with the third service ("QoS Class 2") indicated in data table 700 are to be limited to a single attempt ("try once"), operations associated with the fourth service ("QoS Class 3") indicated in data table 700 are to be moved to a secondary network platform, and operations associated with the fifth service ("QoS Class 4") indicated in data table 700 are to be denied.

Although not shown in FIG. 7, interpretation data, including data table 700, may include data representative of one or more time components that may be used to conform operations of an access device 104 to one or more network usage throttling levels. Such time components may be employed in any suitable way to define and/or help conform operations to a network usage throttling level. As an example, a time component may specify a time duration (e.g., a minimum or a maximum time duration) for which an access device 104 should conform its operations to a particular network usage throttling level before reverting back to a normal network usage throttling level or checking for a subsequent throttling command. For instance, a time component may specify a minimum amount of time for an access device 104 to use a secondary network resource before being able to revert or consider reverting back to a primary network resource.

As another example, a time component may indicate a delay time for an access device 104 to wait before changing conformance from one throttling level to another. For example, an access device 104 may wait a randomized delay time (e.g., a random length of time after expiration of a predefined minimum time duration) before reverting to a normal throttling level. As another example, an access device 104 may wait a randomized delay time after receipt of a normal throttling command before reverting to a normal throttling level. This may help stagger out the responses of access devices 104 responding to a throttling command.

As mentioned, conformance of one or more operations of access device 104 to a network usage throttling level may include directing or otherwise moving one or more network usage operations from one network resource to another network resource. This may include redirecting network usage operations away from any network resource normally used for the network usage operations to another network resource not normally used for the network usage operations. The network resources may include any resources within wide area network, including, without limitation, network devices, transmission media paths, frequency bands, transmission channels, network protocols, network technologies, and network platforms. As an example, one or more network usage operations may be directed away from a frequency band normally used for the network usage operations to another frequency band to conform operations to a network usage throttling level. As another example, one or more network usage operations may be directed away from a network platform normally used for the network usage operations to another network platform to conform operations to a network usage throttling level.

Figure 8:
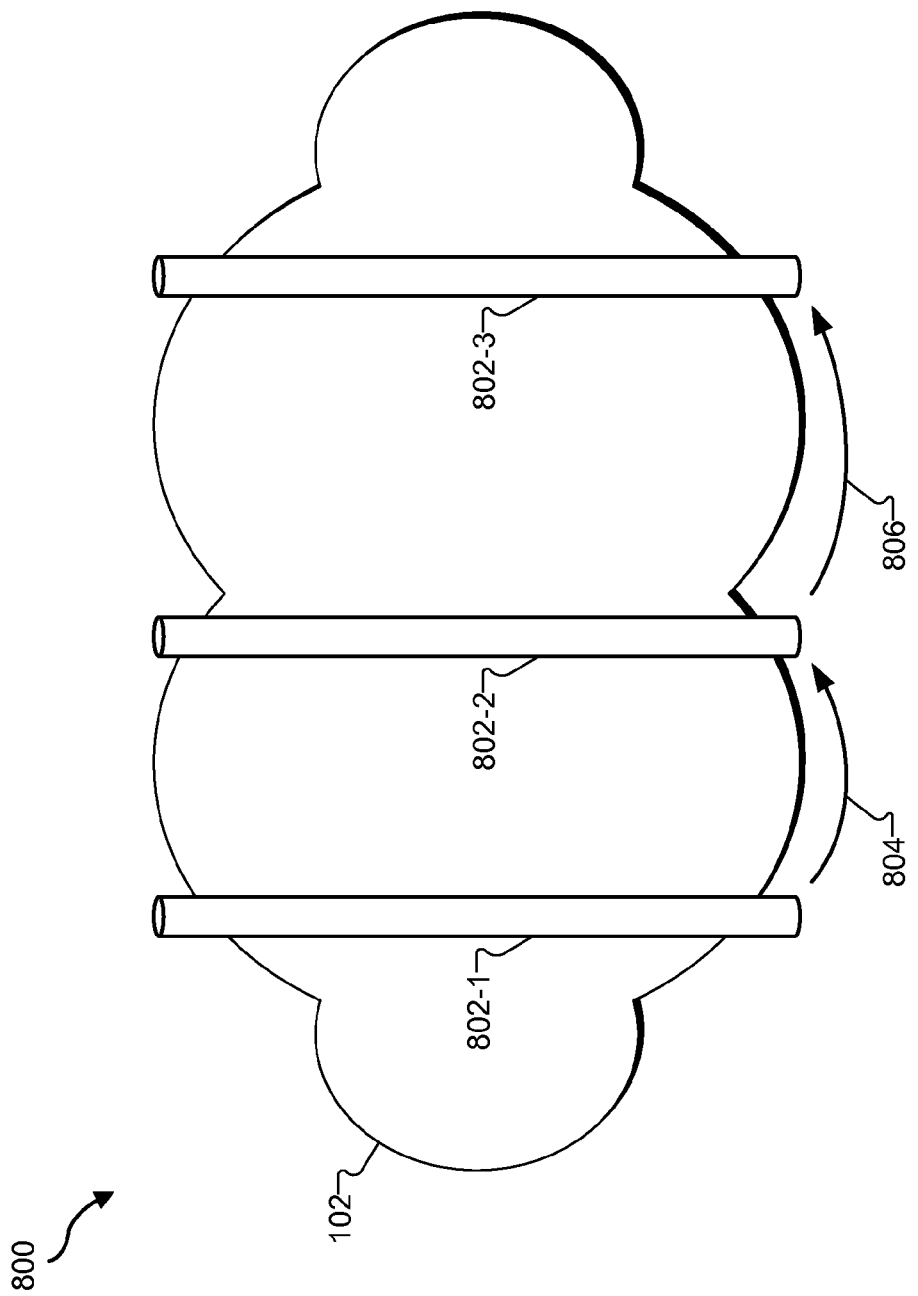
FIG. 8 illustrates an exemplary redirection of network usage operations between network resources.

FIG. 8 illustrates an exemplary redirection 800 of network usage operations to various network platforms within wide area network 102. As shown in FIG. 8, wide area network 102 may include distinct network platforms 802 (e.g., network platforms 802-1 through 802-3). In certain embodiments, for example, network platform 802-1 may include an LTE data network platform, network platform 802-2 may include an EVDO data network platform, and network platform 802-3 may include a 1×RTT network platform. Network usage operations may be redirected from one network platform 802 to another to conform the network usage operations to a network usage throttling level. For instance, certain network usage operations may be redirected from network platform 802-1 to network platform 802-2 (e.g., from an LTE data network platform to an EVDO data network platform) as represented by arrow 804 such as when monitored usage of network platform satisfies a predefined usage threshold. Additionally or alternatively, certain network usage operations may be redirected from network platform 802-2 to network platform 802-3 (e.g., from an EVDO data network platform to a 1×RTT data network platform) as represented by arrow 806 such as when monitored usage of network platform 802-2 satisfies a predefined usage threshold.

Figure 9:
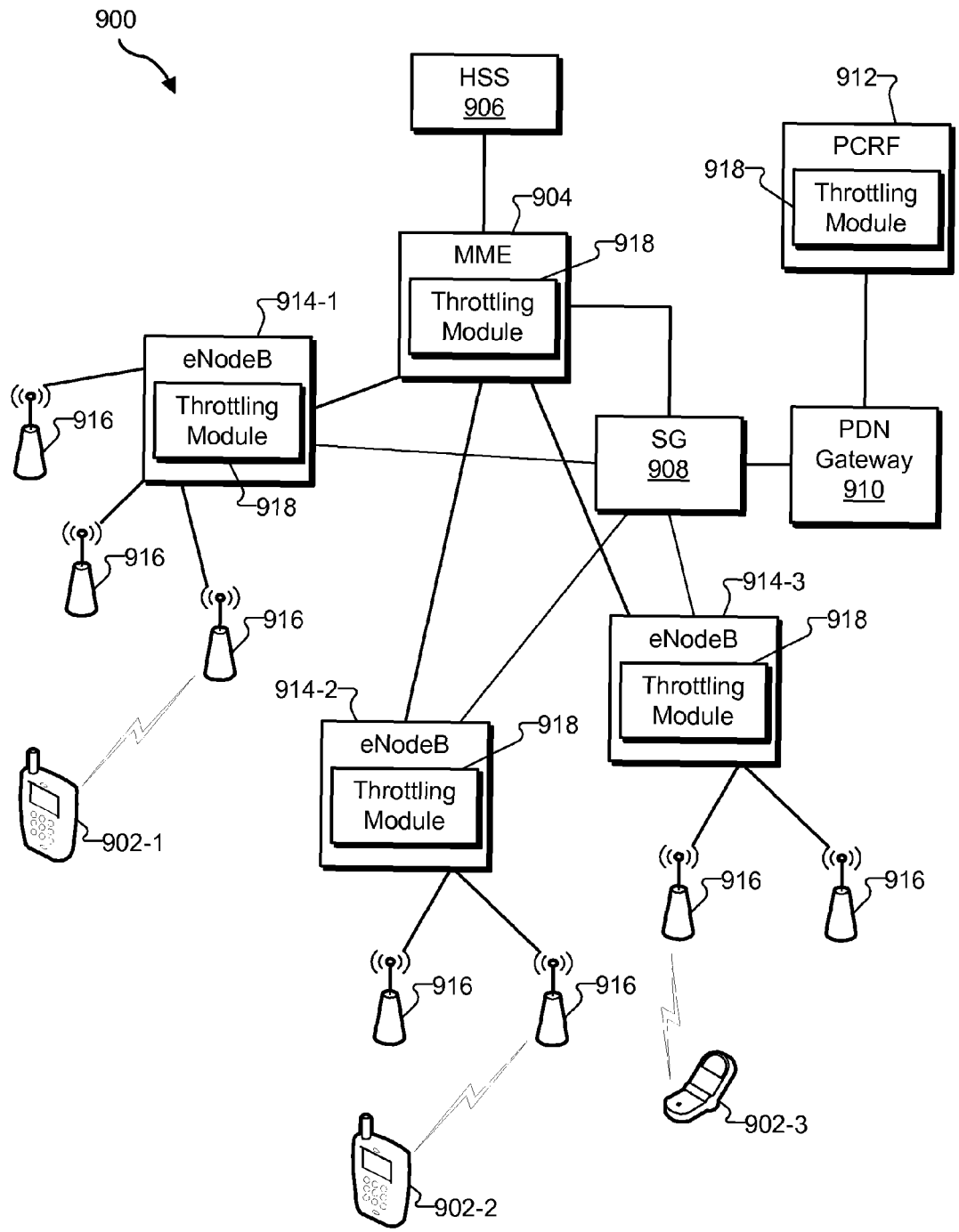
FIG. 9 illustrates an exemplary implementation of the system of FIG. 1.

FIG. 9 illustrates an exemplary implementation 900 of the system 100 of FIG. 1. In implementation 900, components of system 100 configured to control throttling of network usage are distributed across multiple network elements. This may support network-wide and localized throttling of network usage.

The network elements shown in FIG. 9 may provide end-user mobile devices 902 (e.g., mobile devices 902-1 through 902-3) with access to an LTE data network platform and related services within a wide area network such as a mobile phone network. As shown in FIG. 9, implementation 900 may include network elements in the form of a mobile management entity ("MME") 904, a home subscriber server ("HSS") 906, a serving gateway ("SG") 908, a packet data network ("PDN") gateway 910, a policy and charging function ("PCRF") 912, and multiple "eNodeB" elements 914 (e.g., eNodeB elements 914-1 through 914-3), and radio access network equipment 916 interconnected as shown. While implementation 900 includes network elements configured to support an LTE data network platform, this is illustrative only. Other network elements may be used in other embodiments.

One or more of the network elements shown in FIG. 9 may be configured to provide and/or perform one or more of the network usage throttling functions described herein. In the illustrated example, a throttling module 918 is implemented by each of the eNodeB elements 914, MME 904, and PCRF 912. This configuration is illustrative only. Other configurations may be employed in other embodiments as may suit various network architectures.

Each of the throttling modules 918 may be configured to perform one or more of the network usage throttling operations described herein. To illustrate, examples of network usage throttling operations within implementation 900 will now be described. For purposes of the following examples, it is assumed that each of the mobile devices 902 has different capabilities, subscription services, and/or subscriber levels associated therewith. For example, mobile device 902-1 may include a "smart phone" having access to a voice service, a video service, a best efforts e-mail messaging service, and a best efforts web browsing service based on a subscription of a subscriber ("subscriber A") associated with mobile device 902-1. Mobile device 902-1 may have radio interface capabilities for an LTE data network platform only. Mobile device 902-2 may include a "smart phone" having access to a voice service, a best efforts e-mail messaging service, and a best efforts web browsing service based on a subscription of a subscriber ("subscriber B") associated with mobile device 902-2. Mobile device 902-2 may have radio interface capabilities for an LTE data network platform and legacy CDMA technologies such as an EVDO data network platform and a 1×RTT data network platform. Mobile device 902-3 may include a "traditional phone handset" having access to a voice service and a text messaging service based on at least one of limited capabilities of the handset and a subscription of a subscriber ("subscriber C") associated with mobile device 902-3.

Initially, each of the mobile devices 902 may be provided with an instance of throttling command interpretation data. The interpretation data may be provided in any of the ways described above, including one or more network elements transmitting instances of interpretation data to the mobile device 902 in response to a predetermined event such as registration of the mobile devices 902, for example. In certain embodiments, the interpretation data may be provided within control signals transmitted via a broadcast control channel on which mobile devices 902 listen. The interpretation data may be in the form of one or more data tables or data table entries, such as the data table 700 shown in FIG. 7. The interpretation data instances may be stored in one or more network elements such as PCRF 912 or HSS 906 prior to transmission to the mobile devices 902, or the interpretation data instances may be dynamically generated "on the fly" for transmission to the mobile devices 902.

As mentioned, the interpretation data instances may be specific to particular mobile devices 902 and/or subscribers associated with the mobile devices 902. For example, an interpretation data table for mobile device 902-1 may include more entries than an interpretation data table for mobile device 902-3 because mobile device 902-1 provides more capabilities and/or access to more services than mobile device 902-3. Alternatively, a single uniform instance of interpretation data may be provided to all mobile devices 902, and each of the mobile devices 902 may be configured to interpret the interpretation data instance in a way that is specific to the mobile device 902, such as by ignoring entries in the interpretation data instance that are not applicable to the mobile device 902.

One or more of the network elements in implementation 900 may monitor network operation and/or usage. In some examples, the monitoring may include detecting situations indicative of actual or anticipated network overload conditions (e.g., bandwidth overload conditions). For example, network usage (e.g., bandwidth usage) may be detected to exceed a predetermined threshold. As another example, scheduled instances of high network demand (e.g., time periods before/after large events) may indicate likely overload conditions.

In response to a detection of a network overload condition, one or more of the network elements in implementation 900 may broadcast a throttling command to the mobile devices 902. The broadcast may be network-wide or localized. For example, a particular eNodeB element 914 may broadcast the throttling command in a localized manner to only the mobile devices served by the eNodeB element 914. Alternatively, the throttling command may be broadcast more broadly as directed by another network element such as MME 904. As such, control of network usage throttling may be orchestrated by MME 904 while allowing for local autonomy (e.g., for each eNodeB element 914) in order to quickly react to detected overload conditions. An eNodeB element 914 may be configured to impose localized network usage throttling operations as appropriate and that may be more stringent than network usage throttling operations orchestrated by MME 904.

Each of the mobile devices 902 may receive and interpret the broadcast throttling command based on the interpretation data instance maintained by the mobile device 902. Each of the mobile devices 902 may then conform its operation to a network usage throttling level based on the interpretation of the throttling command. The conformance may include performing any of the conformance operations described herein, including allowing, limiting, redirecting, and/or denying certain network usage operations.

To illustrate, a large event (e.g., a major nationwide event) may cause a spike in network usage. In response to a detection of the spike, MME 904 instructs each of the eNodeB elements 914 to broadcast a throttling command to all of the mobile devices 902 served by the eNodeB elements 914. Each mobile device 902 may receive and interpret the throttling command and conform one or more operations of the mobile device 902 to a network usage throttling level associated with the throttling command. In particular, each mobile device 902 may determine, based on interpretation data, what services are affected and how they are affected when operating in accordance with the network usage throttling level associated with the throttling command. As described above, this may be different for each mobile device 902. For mobile device 902-1, for example, the throttling command may deny the video service, limit the best efforts data services to a particular number of attempts (e.g., "try once"), and allow the voice service. For mobile device 902-2, the throttling command may redirect the best efforts data services to a secondary network platform (e.g., to an EVDO network platform) and allow the voice service. For mobile device 902-3, the throttling command may have no effect on the voice service or the text messaging service accessible by mobile devices 902-3.

Subsequently, eNodeB element 914-2 may detect that the overload condition continues within the area served by eNodeB element 914-2, perhaps due to locally heavy network usage. In response, eNodeB element 914-2 may broadcast a second throttling command to all of the mobile devices 902 within the area served by eNodeB element 914-2, including mobile device 902-2. The second throttling command may be more restrictive than the first throttling command. For example, the second throttling command may be associated with a network usage throttling level that denies access to all network services except for a best efforts text messaging service. Accordingly, mobile device 902-1 may deny all network usage operations other than best efforts text messaging service operations.

Subsequently, MME 904 may detect remediation of the overload condition caused by the large event as described above. In response, MME 904 may instruct each of the eNodeB elements 914 to broadcast a third throttling command configured to return the mobile devices 902 to normal operation. If eNodeB element 914-2 continues to detect a localized overload condition, however, eNodeB element 914-2 may defer broadcasting the third throttling command until a later time at which the local overload condition has subsided.

These examples are illustrative of how one or more network elements or devices may monitor network usage, select a throttling command based on the network usage, and broadcast the throttling command to one or more end-user access devices, which may interpret the throttling command and conform one or more network usage operations to one or more network usage throttling levels in accordance with the interpretation of the throttling command. These specific examples are illustrative only and not limiting.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by an access device, throttling command interpretation data;
   receiving, by the access device, a throttling command broadcast over a wide area network;
   interpreting, by the access device, the throttling command based on the throttling command interpretation data; and
   conforming, by the access device, at least one operation of the access device to a network usage throttling level in accordance with the interpretation of the throttling command by the access device.

2. The method of claim 1, wherein the throttling command is received as part of a normal control signaling broadcast over the wide area network.

3. The method of claim 1, wherein the maintaining of the throttling command interpretation data comprises receiving the throttling command interpretation data from at least one network device via the wide area network and storing the throttling command interpretation data in a storage facility of the access device.

4. The method of claim 1, wherein:
   the throttling command interpretation data comprises a data table including a plurality of throttling commands mapped to a plurality of graduated network usage throttling levels, the network usage throttling level included within the plurality of graduated network usage throttling levels; and the interpreting comprises identifying, within the data table, the network usage throttling level, from the plurality of graduated network usage throttling levels, as being associated with the throttling command.

5. The method of claim 4, wherein each of the graduated network usage throttling levels specifies a set of one or more network usage conformance commands, each of the network usage conformance commands being specific to a service accessible by the access device via the wide area network.

6. The method of claim 1, wherein the conforming comprises redirecting the at least one operation from a first network resource normally used for the at least one operation to another data network resource within the wide area network.

7. The method of claim 6, wherein the redirecting of the at least one operation from the first network resource to another data network resource within the wide area network comprises redirecting the at least one operation from a Long Term Evolution ("LTE") network platform to at least one of an Evolution Data Optimized Protocol ("EVDO") network platform and a One Times Radio Transmission Technology ("1xRTT") network platform.

8. The method of claim 1, wherein the conforming of the at least one operation of the access device to the network usage throttling level comprises at least one of:
allowing an operation that is specific to a first service accessible by the access device via the wide area network;
limiting an operation that is specific to a second service accessible by the access device via the wide area network; and
denying an operation that is specific to a third service accessible by the access device via the wide area network.

9. The method of claim 8, wherein:
the first service comprises one of a text-messaging service and a voice service;
the second service comprises a data service; and
the third service comprises a video service.

10. The method of claim 8, wherein each of the first, second, and third services is associated with a different quality of service class.

11. The method of claim 1, further comprising:
maintaining, by an additional access device, the throttling command interpretation data;
receiving, by the additional access device, the throttling command broadcast over the wide area network;
interpreting, by the additional access device, the throttling command based on the throttling command interpretation data; and
conforming, by the additional access device, at least one operation of the additional access device to a different network usage throttling level in accordance with the interpretation of the throttling command by the additional access device.

12. The method of claim 11, wherein:
the maintaining of the throttling command interpretation data by the access device comprises the access device maintaining a copy of a uniform instance of the throttling command interpretation data; and
the maintaining of the throttling command interpretation data by the additional access device comprises the additional access device maintaining an additional copy of the uniform instance of the throttling command interpretation data.

13. The method of claim 11, wherein:
the maintaining of the throttling command interpretation data by the access device comprises the access device maintaining an instance of the throttling command interpretation data that is specific to the access device; and
the maintaining of the throttling command interpretation data by the additional access device comprises the additional access device maintaining a different instance of the throttling command interpretation data that is specific to the additional access device.

14. The method of claim 1, embodied as computer-executable instructions on at least one non-transitory computer-readable medium.

15. A method comprising:
receiving and storing, by a first access device, a first throttling command interpretation data instance specific to the first access device;
receiving and storing, by a second access device, a second throttling command interpretation data instance specific to the second access device;
receiving, by the first access device and the second access device, a throttling command broadcast over a wide area network;
interpreting, by the first access device, the throttling command based on the first throttling command interpretation data instance;
conforming, by the first access device, at least one operation of the first access device to a first network usage throttling level in accordance with the interpretation of the throttling command by the first access device;
interpreting, by the second access device, the throttling command based on the second throttling command interpretation data instance; and
conforming, by the second access device, at least one operation of the second access device to a second network usage throttling level in accordance with the interpretation of the throttling command by the second access device.

16. The method of claim 15, wherein the throttling command is received as part of normal control signaling broadcast over the wide area network.

17. The method of claim 15, wherein:
the first throttling command interpretation data instance is received by the first access device in association with a registration of the first access device; and
the second throttling command interpretation data instance is received by the second access device in association with a registration of the second access device.

18. The method of claim 15, wherein the first network usage throttling level is relatively more restrictive than the second network user throttling level.

19. The method of claim 18, wherein:
the first access device is associated with a first subscription level;
the second access device is associated with second subscription level; and
the second subscription level has a higher priority than the first subscription level.

20. The method of claim 15, embodied as computer-executable instructions on at least one non-transitory computer-readable medium.

21. An apparatus comprising:
a storage facility configured to store throttling command interpretation data;

a communication facility configured to send and receive communication signals via a wide area network, including receiving a throttling command broadcast over the wide area network;
a processor communicatively coupled to the storage facility and the communication facility; and
a throttling client facility configured to direct the processor to
  interpret the throttling command based on the throttling command interpretation data, and
  conform at least one operation of the apparatus to a network usage throttling level in accordance with the interpretation of the throttling command.

22. The apparatus of claim 21, wherein:
the apparatus comprises a mobile phone device; and
the wide area network comprises a mobile phone network.

* * * * *